US005122171A

United States Patent [19]

Kalen et al.

[11] Patent Number: 5,122,171

[45] Date of Patent: Jun. 16, 1992

[54] APPARATUS FOR SEPARATING PARTICULATE MATERIAL FROM HOT GAS

[75] Inventors: Bodo Kalen, Huntington Bay; Nicholas L. Giuricich, Dix Hills, both of N.Y.; Aidan O'Broin, Brampton, England

[73] Assignee: Emtrol Corporation, Hauppauge, N.Y.

[21] Appl. No.: 640,022

[22] Filed: Jan. 11, 1991

[51] Int. Cl.[5] .............................................. B01D 45/12

[52] U.S. Cl. ........................................ 55/349; 55/346; 55/459.5

[58] Field of Search ........................ 55/1, 52, 343-349, 55/459.5, 459.1; 210/512.1

[56] References Cited

U.S. PATENT DOCUMENTS

| | | | |
|---|---|---|---|
| 3,254,478 | 6/1966 | Szego | 55/459.5 X |
| 4,285,706 | 8/1981 | Dehne | 55/343 |
| 4,324,563 | 4/1982 | Jones et al. | 55/349 X |
| 4,348,215 | 9/1982 | Dehne | 55/349 |
| 4,398,932 | 8/1983 | Dehne | 55/349 |
| 4,728,348 | 3/1988 | Nelson et al. | 55/345 |
| 4,746,340 | 5/1988 | Durre et al. | 55/347 |

*Primary Examiner*—Charles Hart
*Attorney, Agent, or Firm*—Robbins & Robbins

[57] ABSTRACT

An apparatus are disclosed for separating particulates from hot gas in the type of system employing a particulate gas chamber, a clean gas outlet chamber and an array of separator units. The structure defining the clean gas chamber is suspended solely from a top cover of a housing thus avoiding serious heat differentiala problems. The separator units are provided with a novel inlet to enhance separation efficiency, and a method is provided for increasing bypass of particulate past the separator units without adversely affecting the operation thereof.

5 Claims, 3 Drawing Sheets

APPARATUS FOR SEPARATING PARTICULATE MATERIAL FROM HOT GAS

BACKGROUND OF THE INVENTION

This invention relates to a method and apparatus for separating particulate material from hot gas, commonly known as a cyclone separator. In addition, the invention relates to a device for accelerating the rate of flow of particulate material into a cyclone separator unit of such apparatus whereby the separation is improved. In particular, the apparatus of the present invention is useful in fluidized processes in general and more specifically in fluidized bed processes for regenerating spent catalyst.

In a broad sense, the apparatus of the invention is utilizable in a wide variety of industrial uses where particulate material is to be separated from gas. The basic problem is of long standing and dates back at least to the early years of the century when U.S. Pat. No. 1,333,325 issued Mar. 9, 1920 disclosed a gas cleaning apparatus utilizing the concept of introducing the particle laden gas into a gas distributing chamber surrounding a collecting chamber, and providing a plurality of separator pipes connecting the distributing chamber to the collecting chamber and means for imparting a whirling motion to gases entering the separator pipes to thereby separate the gases into a central core of cleaned gases and a peripheral layer of impurity laden gases.

As the years have passed separation techniques have become more and more sophisticated. U.S. Pat. 2,583,921 issued Jan. 29, 1952, directed specifically to the problem of separating fly ash from the gaseous products of combustion of pulverulent fuel, introduced the concept of utilizing a battery of radially disposed horizontal cyclone separators in a structure comprising an upper mixing chamber, a central separating chamber and a bottom fly-ash-receiving chamber.

With increasing demand to eliminate air pollution, accompanied by stringent antipollution laws, and with the need for maximum conservation of energy, there has been a continuing effort to seek out means of improving the design of cyclone separators. The problem is frequently complicated by the presence of substantial temperature differentials existing in various parts of the structure, a need to avoid problems of material fatigue, and avoidance of any clogging up of particulate material.

SUMMARY OF THE INVENTION

It has been discovered that many of the problems manifest in prior art cyclone separators are directly attributable to faulty support of the internal gas cleaning structure where very substantial heat related problems are encountered and clogging of the system can result from cumbersome forms of such structure.

The present invention overcomes these problems in a very simple way. The entire internal gas cleaning structure including the clean gas discharging chamber or portion is suspended separately in load bearing relation solely from the top portion of the apparatus housing which is preferably in the form of an upwardly extending arc. This avoids the need for additional support structure for expansion at some lower point along the clean gas chamber and the problems which tend to accompany use of such additional support. If desired, two gas inlets may be provided to distribute evenly the load to the gas laden chamber within which the gas outlet chamber is positioned.

The invention also introduces a separator unit with a special convergent inlet which minimizes the inlet velocity at the entrance to the separator unit. This lower velocity at the entrance to the separator unit results in lower drag forces on the particulates causing greater amounts of particulate by-pass and disposition for separation in the particulate laden gas chamber.

This concept leads directly to a novel method of enhancing the efficiency of the cyclone separator by increasing the amount of particulate material which, having by-passed the cyclone separator, exits through an auxiliary outlet, this being achieved without impairing the efficiency of the separator units.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
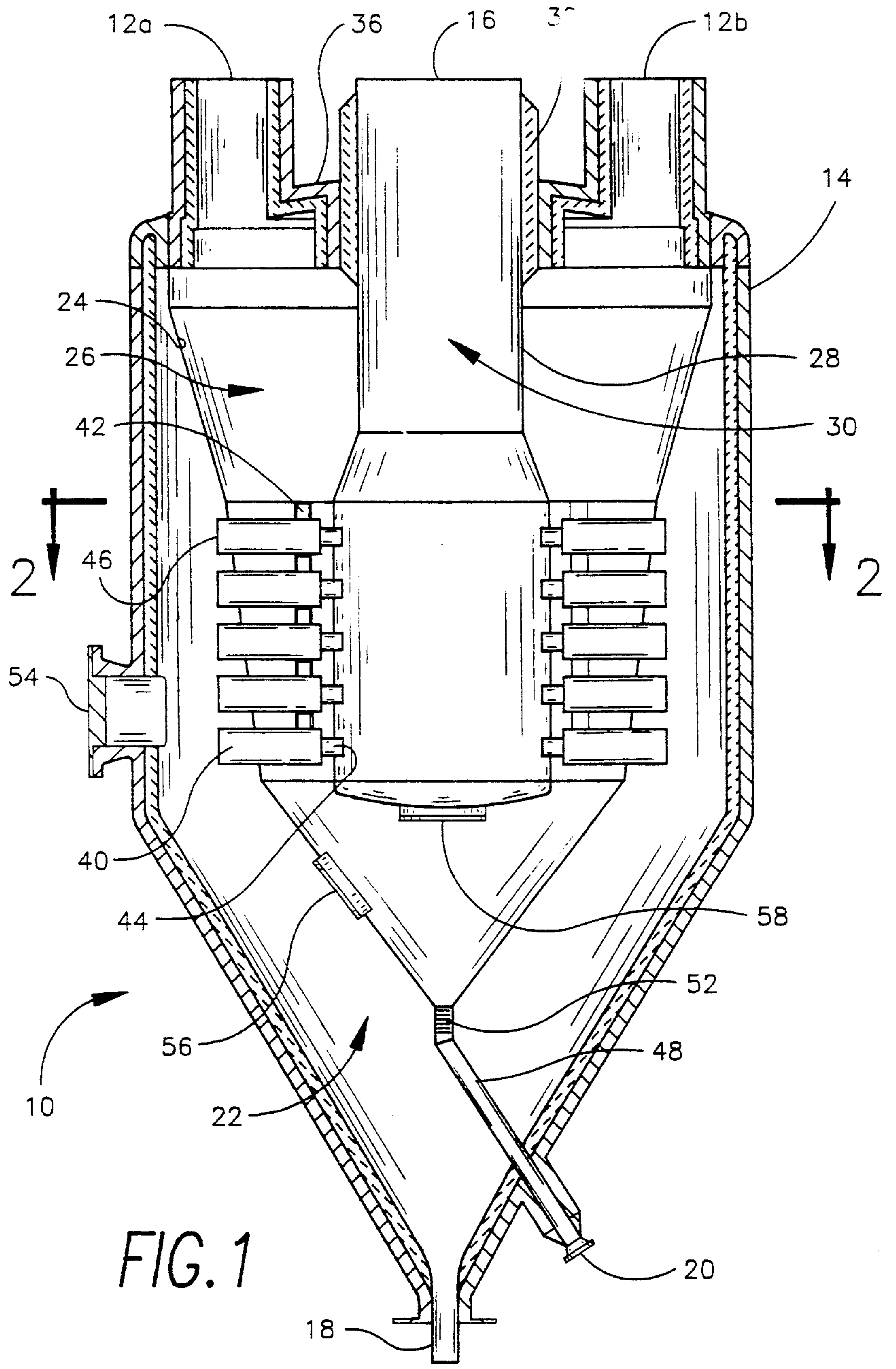
FIG. 1 is a schematic view in elevation partly in section through the center of the apparatus showing the manner of supporting the clean gas chamber and other relative parts of the apparatus.

The particulate laden gas separator of this invention is generally referred to by the reference numeral 10 in FIG. 1. It is comprised of a pair of evenly spaced from the center and diametrically disposed gas inlets 12*a* and 12*b*, a particulate separator housing or body 14, a gas discharge outlet 16, a main solids outlet 18 and an auxiliary solids outlet 20.

In most instances, where the particle laden gas is introduced at temperatures in the neighborhood of 1400° F., the walls of housing 14 will be insulated. In some installations it is customary to employ a heat exchanger at a point in advance of introduction of this gas to the cyclone separator to reduce the temperature of the incoming gas to a value in the neighborhood of 600° F. In a separator designed for such use, uninsulated steel housing walls may be substituted.

The interior of housing 14 is divided into a housing chamber 22 bounded on the outside by the walls of said housing 14 on the interior by a subhousing 24 which also forms the outer boundary of a particulate laden gas chamber 26. The interior boundary of chamber 26 is defined by clean gas chamber housing structure 28 concentrically enclosing a clean gas chamber 30.

Clean gas structure 28 is supported centrally and in its entirety in load bearing relation from refractory insulated member 32 which embraces the top portion thereof. Refractory insulated member 32, in turn, is supported by arcuate top cover 36 of steel or the like constituting a part of housing 14. By virtue of the arcuate top cover 36 separately supporting the sub-housing 24 and the clean gas chamber structure 28 temperature differentials may be accommodated with improved safety, although in some installations a flat cover may be used.

Figure 2:
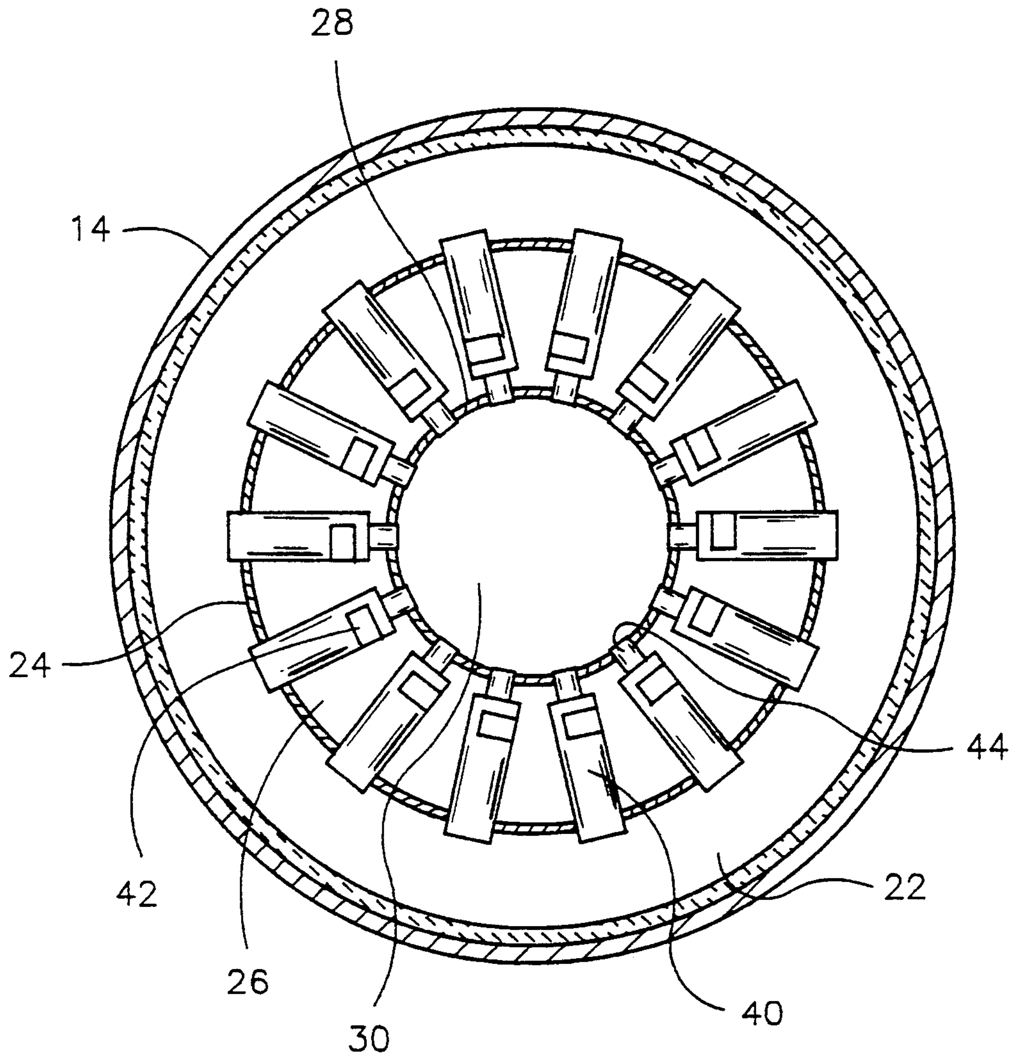
FIG. 2 is a view along section 2—2 of FIG. 1.

Mounted in arrays around the lower section 28 of clean gas chamber 30, as seen in FIG. 2, are several layers of separator units 40 supported between clean gas structure 28 and subhousing 24. As the particulate laden gas flows past the individual separator units 40, it is drawn into the unit through an orifice 42. Clean gas separated within said unit 40 is discharged through an orifice 44 into clean gas chamber 30. Particles separated from the gas are discharged through an orifice 46 into the housing chamber 22 and descend toward the lower portion thereof where they may be withdrawn through main solids outlet 18. The separator 40 units are connected laterally between the sub-housing wall 24 and the clean gas structure wall 28 and avoid load bearing stresses on the separator units 40 that might contribute to strain in the support of these separate structures from the top cover 36.

During operation, a certain amount of the particles from the particulate laden gas will bypass the layers of separator units 40 and descend to the bottom of particulate laden gas chamber 26. Auxiliary solids outlet 20 comprises a tubular member 48 mounted on housing 14 and connected at its upper end to the lower extremities of subhousing 24 by an expansion joint 52 which performs no load bearing function.

For access to housing chamber 22 a manhole 54 is provided on the side of housing 14. Likewise, for access to the interior of particulate laden gas chamber 26 and clean gas chamber 30 respectively, access ports 56 and 58 are mounted on subhousing 24 and clean gas structure 28.

Figure 3:
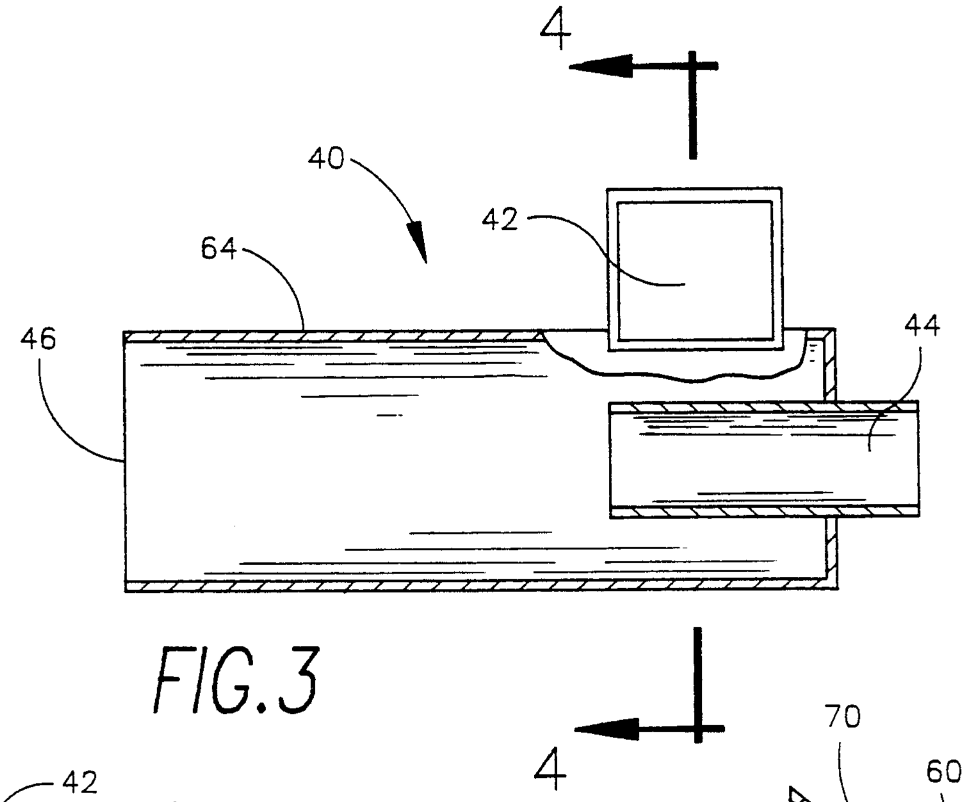
FIG. 3 is a view partly in axial section of a side elevation of a typical separator unit.

FIG. 3 shows a novel separator unit 40 which, while especially useful in the apparatus of the present invention, can also be used to advantage in other cyclone separator designs.

As previously explained, the particulate laden gas is drawn into the unit 40 through orifice 42, and a certain portion of the approaching particulate will bypass the separator unit 40 and descend to the bottom of particulate laden gas chamber 26. It is desirable to maximize the amount of particulate which bypass the separator unit 40, since additional bypass will enhance separation efficiency and reduce wear on the separator units. Such bypass is provided through the use of a novel cyclone inlet design shown in FIGS. 4, 5 and 6. These embodiments utilize an inlet configuration with a flared opening 42 which converges to the smaller cyclone inlet throat 62 creating an accelerating flow once the gas enters the convergent inlet.

A conventional cyclone inlet design normally uses an inlet opening which is an extension of the cyclone throat inlet area; thus, the velocity at the cyclone inlet with the convergent opening of the present invention will be significantly lower than in the conventional cyclone design. The reduced entrance velocity at the convergent inlet results in lower drag forces on the particulate which otherwise tend to carry the particulate into the cyclone inlet; thereby resulting in greater amounts of particulate bypass and its deposition in particulate laden gas chamber 26.

Figure 4:
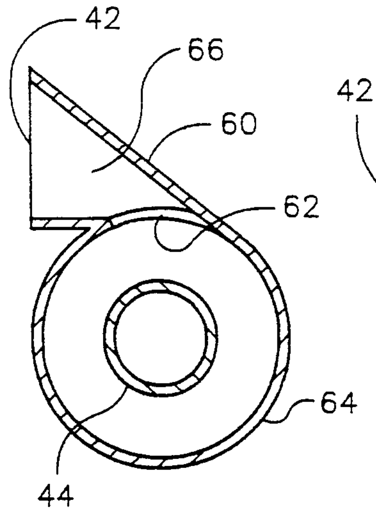
FIG. 4 is a view along section 4—4 of FIG. 3.
Figure 5:
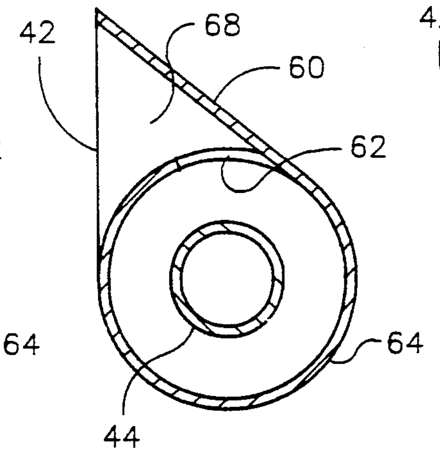
FIG. 5 is a view taken similarly to FIG. 4 showing a modified separator unit.
Figure 6:
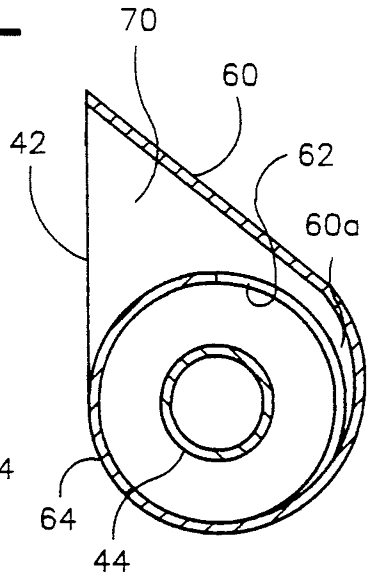
FIG. 6 is a view taken similarly to FIG. 4 showing a further modified separator unit.

FIG. 4 shows a convergent inlet 66 having side walls forming the inlet 62. FIG. 5 shows a flared inlet 68 in which one side wall forms part of the inlet 62 and another wall is formed by part of the separator shell 64. FIG. 6 is similar to FIG. 5 but shows an inlet 70 which has been enlarged by the step of enlarging the inlet wall 60 beyond the separator shell 64 to a point of merger up to nearly half the circumference of the shell.

The modified convergent inlets of FIGS. 4, 5 and 6 provide for increased separator efficiency and particulate separation both through by-pass to the bottom of the particulate laden hot gas chamber 26 and separation in the separation units 40 and delivery through orifice 46 to housing chamber 22 and main outlet 18. The convergent inlet members 60 also act to provide a shield for the opening 42 against the downcoming axially directed particulate laden hot gas to facilitate some by-pass of the solid particulates.

In addition, the acceleration of the gases in the convergent inlet and the configuration of the inlet concentrates the particles near the cylindrical wall of the separating unit 40 as the particle laden gas stream enters the cyclone throat 62 thus enhancing particle separation within the separating unit 40.

Figure 7:
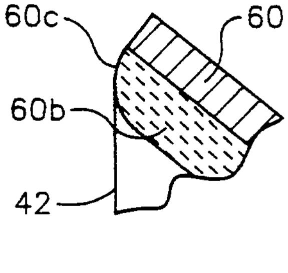
FIG. 7 is a fragmentary view partially in section of the flared inlet with a ceramic coating.

In the event the separator units 40 are provided with internal linings 60*b* of ceramic material, preferably on all internal surfaces, to reduce abrasion, these linings should be formed with a radius inlet 60*c* to minimize turbulence at the inlet entrance as indicated in FIG. 7.

Also, in the event of extraordinarily heavy surges of particulate loading due to maloperation or upsets in the system delivering the particle laden gas to the apparatus 10, these surges will bypass the separator units 40 and be deposited in the bottom of particulate laden gas chamber 26, and removed through auxiliary outlet 20 thereby preventing plugging of the system.

In typical operation of the apparatus, the particulate laden gas is fed to gas inlets 12*a* and 12*b* at temperatures in the neighborhood of 1400° F. and at a pressure of several atmospheres. The entrance of housing 14 is exposed to ambient temperatures. Thus, there is a substantial temperature differential between the housing and the vessel internal gas cleaning apparatus.

The cleaned gas emerges from cleaned gas chamber 30 and is discharged to atmosphere after further pressure reduction. Power recovery systems in the form of expansion turbines or heat exchanger may also be employed prior to discharge of the clean gas to the atmosphere.

The particulate material entering the apparatus is separated and deposited in the particulate laden gas chamber 26 and housing chamber 22 from which it is removed. In some instances it is gravity removed or it may be withdrawn with a small portion of the entering gas stream for use in conveying the material from the apparatus.

From the commercial viewpoint, certain qualities of the apparatus assume special importance. The typical user has come to expect several years of continuous trouble free operation without clogging between scheduled inspection and maintenance shutdowns.

Equipment shape and compactness also are at a premium. Users expect to have such apparatus trucked to the site where it is to be used and easily installable. The simplicity and interaction of parts of the present invention leads directly to fulfillment of such requirements.

Various changes and modifications may be made within this invention as will be apparent to those skilled in the art. Such changes and modifications are within the scope and teaching of this invention as defined in the claims appended hereto.

What is claimed is:

1. Apparatus for separating particulate material from hot gas, comprising: a housing having a transversely extending top cover portion, conduit means communicating with the exterior of said housing and serving to conduct particulate laden hot gas to a particulate laden hot gas chamber within said housing, a clean gas receiving chamber suspended in load bearing relation solely from the top cover portion of said housing and serving to emit cleaned gas upwardly to the housing exterior, a particle discharge chamber disposed between said housing and said particulate laden gas chamber, and a plurality of separator units disposed transversely through said particulate laden gas chamber for separating particles from gas, discharging the gas into said clean gas chamber and discharging the particles into said particle discharge chamber.

2. The apparatus of claim 1 in which said transversely extending top cover portion of the housing is in the form of an upwardly extending arc structure.

3. The apparatus of claim 1 in which said conduit means comprises a pair of conduits connected diametrically on opposite sides of said top cover portion.

4. The apparatus of claim 3 in which said pair of conduits are disposed equidistantly from a central portion of said top cover portion, and said clean gas is emitted through an outlet conduit positioned at said central portion of the top cover.

5. The apparatus of claim 1 in which said particulate laden hot gas chamber is defined by an exterior wall of a clean gas structure enclosing said clean gas chamber and by an interior wall of a particulate laden hot gas subhousing, an exterior wall of said latter subhousing serving together with the wall of the main housing to define a particle receiving chamber.

* * * * *